(12) United States Patent
Sugiki et al.

(10) Patent No.: US 6,512,021 B1
(45) Date of Patent: Jan. 28, 2003

(54) PHOTOCURABLE SEALING MATERIAL

(75) Inventors: Takanori Sugiki, Tokyo (JP); Yuichi Nishida, Tokyo (JP); Yoshio Kishimoto, Tokyo (JP)

(73) Assignee: Nichiban Company Limited, Tokyo (JP)

( * ) Notice: Subject to any disclaimer, the term of this patent is extended or adjusted under 35 U.S.C. 154(b) by 83 days.

(21) Appl. No.: 09/806,982

(22) PCT Filed: Aug. 4, 2000

(86) PCT No.: PCT/JP00/05237

§ 371 (c)(1),
(2), (4) Date: Apr. 6, 2001

(87) PCT Pub. No.: WO01/10972

PCT Pub. Date: Feb. 15, 2001

(30) Foreign Application Priority Data

Aug. 6, 1999 (JP) ............................................. 11-223978

(51) Int. Cl.$^7$ ............................. C09D 1/00; C09D 4/02; C09J 1/00; C09J 4/02; C08F 2/46
(52) U.S. Cl. ........................ 522/83; 522/171; 522/180; 522/182; 524/560
(58) Field of Search ............................ 522/83, 84, 171, 522/180, 182; 524/560

(56) References Cited

U.S. PATENT DOCUMENTS

| 4,427,823 | A | * | 1/1984 | Inagaki et al. | ............... 522/168 |
| 4,478,876 | A | * | 10/1984 | Chung | |
| 5,602,221 | A | * | 2/1997 | Bennett et al. | ............. 526/264 |
| 5,654,387 | A | * | 8/1997 | Bennett et al. | ............. 428/516 |

FOREIGN PATENT DOCUMENTS

| JP | 10204412 | * | 8/1998 |
| JP | 63-264679 | * | 11/1998 |

* cited by examiner

Primary Examiner—Susan W. Berman
(74) Attorney, Agent, or Firm—Dike, Bronstein, Roberts & Cushman; IP Group Edwards & Angell, LLP; Peter F. Corless

(57) ABSTRACT

A photo-curing sealing agent comprising (a)an (meth) acrylate ester having a solubility parameter of 9 to 14, hydrophobic silica, and a photo reaction initiator. This sealing agent has high adhesion property to a cold-rolled steel, a galvanized steel or an aluminum alloy, to which a press oil, a rust-preventing oil or the like adheres.

5 Claims, No Drawings

PHOTOCURABLE SEALING MATERIAL

FIELD OF THE INVENTION

The present invention relates to a sealing agent having a satisfactory adhesion property to steel having an oil surface.

BACKGROUND ART

Currently, in the production process of a body for automobile, a large amount of a sealing agent is used for rust prevention and corrosion prevention. The body for automobile is generally produced by a method in which a cold-rolled steel, a galvanized steel, an aluminum alloy, etc., to which a press oil, a rust-preventing oil or the like adheres, is subjected to press molding, and then, it is subjected to degreasing (oil washing) step and electrodeposition coating, and a sealing agent is applied thereonto and dried, followed by intercoating and finish coating. In some cases, before the degreasing step, a sealing agent may be applied and dried.

As the sealing agent used for preventing automobiles from suffering rusting and corrosion, there are a sealing agent of a vinyl chloride system, that of an urethane system and the like, but almost all sealing agents are of a vinyl chloride system, and these are ones obtained by impregnating polyvinyl chloride with a plasticizer, a stabilizer and the like.

A vinyl chloride sealer is generally of a heat curing type, and needs to be heated at the time of application. Therefore, a heating oven for heating the sealer is needed, so that a large amount of energy is required. Further, this sealer contains chlorine, and therefore, a problem is encountered in that the sealer cannot be easily disposed of by burning. In addition, an urethane sealer is of a two-pack type or a moisture curing type, and thus, it has drawbacks that a mixing operation by means of a mixing machine is required before application, and that a long period of time is required until setting of the sealer is completed, and the like. Further, these sealer agents have a poor adhesion property to a cold-rolled steel, a galvanized steel or an aluminum alloy, to which a press oil, a rust-preventing oil or the like adheres, and may flow away therefrom in the oil washing step before coating step.

DISCLOSURE OF THE INVENTION

The present invention is directed to (1) a photo-curing sealing agent comprising (a)an (meth)acrylate ester having a solubility parameter of 9 to 14, hydrophobic silica, and a photo reaction initiator.

In addition, the present invention relates to (2) the photo-curing sealing agent (1) wherein the (meth)acrylate ester having a solubility parameter of 9 to 14 is (a) an (meth) acrylate ester having a phenyl group, a hydroxyl group, or a phenyl group and a hydroxyl group.

Further, the present invention relates to (3) the photo-curing sealing agent (2) wherein the (meth)acrylate ester having a phenyl group and a hydroxyl group is 2-hydroxy-3-phenoxypropyl acrylate or 2-acryloyloxyethyl-2-hydroxyethyl phthalate.

Still further, the present invention relates to (4) any one of the photo-curing sealing agents (1) to (3) further comprising at least one (meth)acrylate ester containing at least one group selected from a phosphoric group, a sulfonic group, a carboxyl group and salts thereof.

The present invention relates to (5) any one of the photo-curing sealing agents (1) to (4), which comprises:
100 parts by weight of the (meth)acrylate ester having a solubility parameter of 9 to 14;
0 to 100 parts by weight of at least one (meth)acrylate ester containing at least one group selected from a phosphoric group, a sulfonic group, a carboxyl group and salts thereof;
2 to 60 parts by weight of the hydrophobic silica; and
0.01 to 20 parts by weight of the photo reaction initiator.

BEST MODE FOR CARRYING OUT THE INVENTION

With respect to the (meth)acrylate ester having a solubility parameter (SP value) of 9 to 14 (preferably 10 to 13, more preferably 11 to 13) in the present invention, there is no particular limitation, but the (meth)acrylate is preferably (a) an (meth)acrylate ester having a phenyl group, a hydroxyl group, or both a phenyl group and a hydroxyl group, and, for example, there can be mentioned 2-hydroxy-3-phenoxypropyl acrylate (SP value=11.9) and 2-acryloyloxyethyl-2-hydroxyethyl phthalate (SP value= 12.4). In addition, a plurality of (meth)acrylates having a solubility parameter of 9 to 14 (preferably 10 to 13, more preferably 11 to 13) may be in combination. Such (meth) acrylates are commercially available, and, for example, 2-hydroxy-3-phenoxypropyl acrylate is available from Toagosei Co., Ltd. as a trade name of ARONIX M-5700, and 2-acryloyloxyethyl-2-hydroxyethyl phthalate is available from Kyoeisha Chemical Co., Ltd. as a trade name of LIGHT ACRYLATE HOA-MPE. It is noted that the SP value in the present specification means a value determined by calculation in accordance with Fedors's method.

With respect to the hydrophobic silica in the present invention, there is no particular limitation, but typically, it is a fine powder obtained by subjecting the surface of silica to hydrophobicity treatment with an alkyl group or the like, and it is preferred that it has an affinity to an oil, a high oil-absorption ability, and properties such that it increases the viscosity so as to be pasty and does not inhibit the transmission of a light. In addition, the carbon content is preferably 0.5 to 6% by weight, more preferably 1 to 4% by weight, and the average particle diameter of the primary particles is preferably 100 nm or less, more preferably 40 nm or less. As commercially available products, for example, there can be mentioned Aerosil R972, R974, RX200, RY200, R202, R805, R812S (Nippon Aerosil Corporated), and the like.

With respect to the photo reaction initiator in the present invention, there is no particular limitation, and there can be mentioned an organic peroxide, a benzoine compound, an acetophenone, a benzophenone, a thioxanthone, an α-acyloximester, a phenylglyoxylate, a benzyl, an azo compound, a diphenyl disulfide compound, an acylphosphine oxide compound, an organic dye compound, an iron-phthalocyanine compound and the like, which are generally used, and especially preferred are a benzoine compound, an acetophenone and an acylphosphine oxide compound. In addition, these may be used in combination.

At least one (meth)acrylate ester containing at least one group selected from a phosphoric group, a sulfonic group, a carboxyl group and salts thereof in the present invention is an optional component for improving the adhesion property to a metal, and, as the (meth) acrylate ester containing a phosphoric group or a salt thereof, for example, there can be mentioned 2-(meth)acryloyloxyethyl acid phosphate, 2-(meth)acryloyloxypropyl acid phosphate and salts of these, and as the (meth)acrylate ester containing a carboxyl group or a salt thereof, for example, there can be mentioned 2-(meth)acryloyloxyethyl phthalate, 2-(meth)

acryloyloxyethyl succinate, 2-(meth)acryloyloxyethyl hexahydrophthalate and salts of these. As the (meth)acrylate containing a sulfonic group or a salt thereof, for example, there can be mentioned 2-acrylamide-2-methylpropane sulfonic acid, 2-methacrylamide-2-methyl sulfonic acid, 2-(meth)acrylamideethane sulfonic acid, 2-(meth)acrylamidepropane sulfonic acid and salts of these. Such (meth)acrylate ester are commercially available and, for example, 2-acryloyloxyethyl acid phosphate is available from Kyoeisha Chemical Co., Ltd. as a trade name of LIGHT ACRYLATE PA, and 2-acryloyloxyethyl phthalate is available from Kyoeisha Chemical Co., Ltd. as a trade name of LIGHT ACRYLATE HOA-MPL.

Further, a monomer having an SP value of less than 9 can be added to the photo-curing sealing agent of the present invention as long as the oil-surface adhesion property is not inhibited, and the sealing agent may contain a crosslinking agent for imparting heat resistance, such as a multifunctional monomer, an oligomer or the like, a plasticizer for imparting low-temperature flexibility, such a phthalate ester or the like, and a surfactant, an oil-absorbing resin, an organic or inorganic pigment, a stabilizer and the like, and further, a heat reaction initiator, such as an organic peroxide or the like, for satisfactorily advancing the curing reaction when applying the sealing agent onto a place where a light is difficult to reach or applying the sealing agent in a large thickness.

Next, the photo-curing sealing agent of the present invention is described. The photo-curing sealing agent of the present invention preferably comprises based on 100 parts by weight of the (meth)acrylate ester having a solubility parameter of 9 to 14, 0 to 100 parts by weight (more preferably 0 to 50 parts by weight) of at least one (meth)acrylate ester containing at least one group selected from a phosphoric group, a sulfonic group, a carboxyl group and salts thereof, 2 to 60 parts by weight (more preferably 4 to 40 parts by weight) of the hydrophobic silica, and 0.01 to 20 parts by weight (more preferably 0.1 to 10 parts by weight) of the photo reaction initiator. In addition, the viscosity of this sealing agent is preferably 10,000 to 200,000 mPa·s. The viscosity is measured in accordance with JIS K-6830 (note: examination method for a sealing material for car).

In addition, the photo-curing sealing agent of the present invention can be produced by a known method for producing a sealing agent. Typically, the sealing agent can be produced by stirring and dispersing the above components by means of a sand mill.

The photo-curing sealing agent of the present invention is applied onto an adherend and cured by light radiation from an appropriate light source in accordance with the same method as the method used for the known sealing agent. With respect to the light source used in the present invention, there is no particular limitation as long as the apparatus generates UV rays, electron rays, infrared rays or the like, and, for example, there can be mentioned an ultra-high pressure mercury vapor lamp, a xenon lamp, a mercury xenon lamp, a high pressure mercury vapor lamp, a metal halide lamp, a moderate pressure mercury vapor lamp, a low pressure mercury vapor lamp, a chemical lamp, a germicidal lamp, a fluorescent lamp for health rays, a black lamp, an excimer laser and the like. These light sources may be used individually or in combination.

EXAMPLES 1 to 12

The compositions having the below formulations were individually stirred and dispersed by means of a sand mill. All the compositions obtained were in a transparent or translucent paste form, and applied onto various adherends so as to have a thickness of 2 mm and subjected to radiation by means of an ultra-high pressure mercury vapor lamp (270 mW/cm$^2$) for 5 seconds. As a result, all the compositions were cured within 5 seconds, and strongly bonded to the various adherends (including an oil surface).

| Formulation | Example 1 | Example 2 | Example 3 | Example 4 | Example 5 | Example 6 | Example 7 | Example 8 |
|---|---|---|---|---|---|---|---|---|
| A (phenyl group + hydroxy) group) | 100 | 80 | 100 | 100 | 100 | 100 | 90 | |
| B (phenyl group + hydroxyl group) | | 20 | | | | | 10 | |
| C (phosphoric group) | | | 10 | | | 5 | 2 | 1 |
| D (sulfonic group) | | | | 10 | | | | |
| E (carboxyl group) | | | | | 10 | 5 | 2 | 1 |
| F (phenyl group only) | | | | | | | | 100 |
| G (hydroxyl group only) | | | | | | | | |
| H | | | | | | | | |
| Crosslinking agent (HDDA) | | | 1 | | | | 1 | 1 |
| Polymer EVA (EV45X) | | | | | | | | |
| Hydrophobic silica (Aerosil P972) | 15 | 15 | 15 | 15 | 15 | 15 | 15 | 15 |
| Plasticizer (DOP) | | 10 | | 10 | | 10 | 10 | |
| Photo reaction initiator (Darocur 1173) | 3 | 3 | 3 | 3 | 3 | 3 | 3 | 3 |
| State before curing | Translucent paste | Translucent paste | Translucent paste | Translucent paste | Translucent paste | Translucent paste | Translucent paste | Translucent paste |
| Photo-curing property | ○ | ○ | ○ | ○ | ○ | ○ | ○ | ○ |
| Adhesion property | | | | | | | | |
| Aluminum | ◎ | ◎ | ◎ | ◎ | ◎ | ◎ | ◎ | ○ |
| Galvanized steel | ○ | ○ | ◎ | ◎ | ◎ | ◎ | ◎ | Δ |
| Zinc phosphate-treated steel | ◎ | ◎ | ◎ | ◎ | ◎ | ◎ | ◎ | ○ |
| Electrodeposition coated plate | ◎ | ◎ | ◎ | ◎ | ◎ | ◎ | ◎ | ◎ |

-continued

| | | | | | | | | |
|---|---|---|---|---|---|---|---|---|
| Aluminum* | ⊚ | ⊚ | ○ | ○ | ○ | ⊚ | ○ | ○ |
| Galvanized Steel* | ○ | ○ | ○ | ○ | ○ | ⊚ | ○ | △ |
| Zinc phosphate-treated steel* | ⊚ | ⊚ | ○ | ○ | ○ | ⊚ | ○ | ○ |
| Heat resistance (180° C.) | ○ | ○ | ⊚ | ○ | ○ | ○ | ⊚ | ⊚ |
| Low-temperature resistance (−30° C.) | ○ | ⊚ | ○ | ⊚ | ○ | ⊚ | ⊚ | ⊚ |
| Water resistance (in boiling water for 1 hour) | ⊚ | ⊚ | ○ | ○ | ○ | ○ | ⊚ | ⊚ |

| Formulation | Example 9 | Example 10 | Example 11 | Example 12 | Example 13 | Example 14 | Example 15 |
|---|---|---|---|---|---|---|---|
| A (phenyl group + hydroxy) group) | | | | | | | |
| B (phenyl group + hydroxyl group) | | | | | | | |
| C (phosphoric group) | 2 | 2 | 2 | 2 | 2 | 2 | 2 |
| D (sulfonic group) | | | | | | | |
| E (carboxyl group) | | 2 | 1 | | | | |
| F (phenyl group only) | | 80 | 50 | 30 | 70 | 100 | 60 |
| G (hydroxyl group only) | 100 | 20 | 50 | 70 | | | |
| H | | | | | 30 | | 40 |
| Crosslinking agent (HDDA) | 1 | 1 | 1 | 1 | | | |
| Polymer EVA (EV45X) | | | | | | 20 | 30 |
| Hydrophobic silica (Aerosil P972) | 15 | 15 | 15 | 15 | 20 | 15 | 15 |
| Plasticizer (DOP) | 10 | | | 5 | | | |
| Photo reaction initiator (Darocur 1173) | 3 | 3 | 3 | 3 | 3 | 3 | 3 |
| State before curing | Translucent paste | Translucent paste | Translucent paste | Translucent paste | Translucent paste | Translucent paste | Translucent paste |
| Photo-curing property | ○ | ○ | ○ | ○ | ○ | ○ | ○ |
| Adhesion property | | | | | | | |
| Aluminum | ⊚ | ⊚ | ⊚ | ⊚ | ○ | ⊚ | ○ |
| Galvanized steel | ○ | ○ | ○ | ○ | ⊚ | ⊚ | ⊚ |
| Zinc phosphate-treated steel | ⊚ | ⊚ | ⊚ | ⊚ | ⊚ | ⊚ | ⊚ |
| Electrodeposition coated plate | ⊚ | ⊚ | ⊚ | ⊚ | ⊚ | ⊚ | ⊚ |
| Aluminum* | ○ | ○ | ○ | ○ | ○ | ○ | ○ |
| Galvanized Steel* | ○ | ○ | ○ | ○ | ⊚ | ⊚ | ⊚ |
| Zinc phosphate-treated steel* | ○ | ○ | ○ | ○ | ⊚ | ⊚ | ⊚ |
| Heat resistance (180° C.) | ⊚ | ⊚ | ⊚ | ⊚ | ⊚ | ⊚ | ⊚ |
| Low-temperature resistance (−30° C) | ⊚ | ⊚ | ⊚ | ⊚ | ⊚ | ○ | ⊚ |
| Water resistance (in boiling water for 1 hour) | ○ | ⊚ | ⊚ | ○ | ⊚ | ⊚ | ⊚ |

Photo-curing property: ○: Good. △: Not cured in a thickness of 2 mm or larger.
Adhesion property evaluation: ⊚: Cannot be peeled off. ○: Strongly adhere. (Can be peeled off.) △: Slightly weak. X: Easily peeled off.
Evaluation of heat resistance, low-temperature resistance and water resistance: ⊚: Good. ○: Almost good. △: Some problems. X: Fluidity, crack, peeling.
*: Press oil was applied (2 to 3 μm).
A: 2-Hydroxy-3-phenoxypropyl acrylate (SP value = 11.9)
B: 2-Acryloyloxyethyl-2-hydroxyethyl phthalate (SP value = 12.4)
C: 2-Acryloyloxyethyl acid phosphate
D: 2-Acrylamide-2-methylpropane sulfonic acid
E: 2-Acryloyloxyethyl phthalate
F: Phenoxyethyl acrylate (SP value = 10.1)
G: 2-Hydroxypropyl acrylate (SP value = 11.5)
H: 2-Ethylhexylcarbitol acrylate
HDDA: 1,6-Hexanediol acrylate
EV45X: VA 46%, manufactured by Du Pont-Mitsui Polychemical Co., Ltd.

COMPARATIVE EXAMPLE 1

A vinyl chloride sealer was applied onto various adherends so as to have a thickness of 2 mm, and cured by heating (at 120° C. for 20 minutes). As a result, the sealer did not practically adhere to the adherends other than a galvanized steel and an electrodeposition coated plate, and also did not practically adhere to the oil surfaces. Further, slight yellowing was recognized at 180° C.

| Adhesion property | Aluminum | X |
| --- | --- | --- |
|  | Galvanized steel | X |
|  | Zinc phosphate-treated steel | ○ |
|  | Electrodeposition coated plate | ○ |
|  | Aluminum* | X |
|  | Galvanized steel* | X |
|  | Zinc phosphate-treated steel* | Δ |
| Heat resistance (180° C.) |  | Δ (slight yellowing) |
| Low-temperature resistance (−30° C.) |  | ○ |
| Water resistance (in boiling water for 1 hour) |  | ○ |

Adhesion property evaluation: ⊚: Cannot be peeled off. ○: Strongly adhere. (Can be peeled off.) Δ: Slightly weak. X: Easily peeled off.
Evaluation of heat resistance, low-temperature resistance and water resistance: ⊚: Good. ○: Almost good. Δ: Some problems. X: Fluidity, crack, peeling.
*: Press oil was applied (2 to 3 μm).

COMPARATIVE EXAMPLE 2

The composition having the below formulation was stirred and dispersed by means of a sand mill. The resultant composition was applied onto various adherends so as to have a thickness of 2 mm, and subjected to radiation by means of an ultra-high pressure mercury vapor lamp (270 mW/cm$^2$) for 5 seconds. As a result, when 15 hydrophilic silica was used in stead of the hydrophobic silica, almost no oil-surface adhesion property was exhibited, so that the water resistance became poor.

| Formulation | Comparative Example 2 |
| --- | --- |
| A (phenyl group + hydroxyl group) | 100 |
| C (phosphoric group) | 2 |
| E (carboxyl group) | 2 |
| Crosslinking agent (HDDA) | 1 |
| Hydrophilic silica (Aerosil 200) | 15 |
| Plasticizer (DOP) | 10 |
| Photo reaction initiator (Darocur 1173) | 3 |
| State before curing | Opaque, high viscosity and fluidity |
| Photo-curing property | Δ |
| Adhesion    Aluminum | ⊚ |
| property    Galvanized steel | ○ |
|             Zinc phosphate-treated steel | ⊚ |
|             Electrodeposition coated plate | ⊚ |
| Aluminum* | X |
| Galvanized steel* | X |
| Zinc phosphate-treated steel* | X |
| Heat resistance (180° C.) | ⊚ |
| Low-temperature resistance (−30° C.) | ⊚ |
| Water resistance (in boiling water for 1 hour) | X |

Photo-curing property: ○: Good. Δ: Not cured in a thickness of 2 mm or larger. (Adhesion property evaluation was conducted in a thickness of 1 mm.)
Adhesion property evaluation: ⊚: Cannot be peeled off. ○: Strongly adhere. (Can be peeled off.) Δ: Slightly weak. X: Easily peeled off.
Evaluation of heat resistance, low-temperature resistance and water resistance: ⊚: Good. ○: Almost good. Δ: Some problems. X: Fluidity, crack, peeling.
*: Press oil was applied (2 to 3 μm).
A: 2-Hydroxy-3-phenoxypropyl acrylate (SP value = 11.9)
C: 2-Acryloyloxyethyl acid phosphate
E: 2-Acryloyloxyethyl phthalate
HDDA: 1,6-Hexanediol acrylate

What is claimed is:

1. A photo-curing sealing agent, comprising (a) an (meth) acrylate ester having a solubility parameter of 9 to 14, hydrophobic silica, and a photo reaction initiator.

2. The photo-curing sealing agent according to claim 1, wherein said (meth)acrylate ester having a solubility parameter of 9 to 14 is (a) an (meth)acrylate ester having a phenyl group, a hydroxyl group, or a phenyl group and a hydroxyl group.

3. The photo-curing sealing agent according to claim 2, wherein said (meth)acrylate ester having a phenyl group and a hydroxyl group is 2-hydroxy-3-phenoxypropyl acrylate or 2-acryloyloxyethyl-2-hydroxyethyl phthalate.

4. The photo-curing sealing agent according to any one of claims 1 to 3, further comprising at least one (meth)acrylate ester containing at least one group selected from a phosphoric group, a sulfonic group, a carboxyl group and salts thereof.

5. The photo-curing sealing agent according to any one of claims 1 to 4, which comprises:

100 parts by weight of the (meth)acrylate ester having a solubility parameter of 9 to 14;

0 to 100 parts by weight of at least one (meth)acrylate containing at least one group selected from a phosphoric group, a sulfonic group, a carboxyl group and salts thereof;

2 to 60 parts by weight of the hydrophobic silica; and 0.01 to 20 parts by weight of the photo reaction initiator.

* * * * *